United States Patent
Haupt et al.

(10) Patent No.: US 6,624,974 B2
(45) Date of Patent: Sep. 23, 2003

(54) RECORDING AND/OR REPRODUCING APPARATUS WITH MECHANISM FOR DAMPING VIBRATIONS OF A COMPONENT PART WHICH COOPERATES WITH A RECORD CARRIER IN THE FORM OF A TAPE

(75) Inventors: Martin Haupt, Vienna (AT); Harald Bürbaumer, Vienna (AT); Stefan Bendekovits, Vienna (AT); Andreas Augustin, Austria (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 205 days.

(21) Appl. No.: 09/793,690

(22) Filed: Feb. 26, 2001

(65) Prior Publication Data

US 2001/0026420 A1 Oct. 4, 2001

(30) Foreign Application Priority Data

Feb. 29, 2000 (EP) .............................. 00890059

(51) Int. Cl.[7] .............................................. G11B 15/60
(52) U.S. Cl. ............................... 360/130.21; 360/261.1
(58) Field of Search ............................ 360/241, 241.3, 360/261.1, 291, 128, 130.21

(56) References Cited

U.S. PATENT DOCUMENTS

| | | | |
|---|---|---|---|
| 4,030,137 A | 6/1977 | Dalziel | 360/261.3 |
| 4,938,325 A | 7/1990 | Nakagawa | 188/378 |
| 5,371,636 A | * 12/1994 | Nayak et al. | 360/75 |
| 5,519,562 A | * 5/1996 | Argumedo et al. | 360/130.21 |
| 5,739,984 A | 4/1998 | Eckberg | 360/261.1 |
| 6,118,630 A | * 9/2000 | Argumedo | 360/130.21 |
| 6,141,184 A | * 10/2000 | Daly | 360/130.21 |

FOREIGN PATENT DOCUMENTS

WO   WO9844499   10/1998   ........... G11B/15/67

* cited by examiner

Primary Examiner—Jefferson Evans

(57) ABSTRACT

In a recording and/or reproducing apparatus (1) having a stationarily mounted and substantially rigid first component part (37) and having at least one pin-like second component part (51, 52) and having a third component part (53) which is movable with respect to the at least one second component part (51, 52), the at least one second component part is fixedly connected to a damping element support (80) and the damping element support (80) extends over the first component part (37) and the damping element support (80) is connected to an elastic damping element (88) which acts upon the first component part (37) under spring load.

3 Claims, 3 Drawing Sheets

US 6,624,974 B2

RECORDING AND/OR REPRODUCING APPARATUS WITH MECHANISM FOR DAMPING VIBRATIONS OF A COMPONENT PART WHICH COOPERATES WITH A RECORD CARRIER IN THE FORM OF A TAPE

FIELD OF THE INVENTION

The invention relates to a recording and/or reproducing apparatus.

BACKGROUND OF THE INVENTION

Such a recording and/or reproducing apparatus is known from, for example, the patent document WO 98/44499 A1. The known recording and/or reproducing apparatus includes a third component part in the form of tape guide roller which is rotatably supported by means of a bearing spindle provided as a second component part. The tape guide roller is arranged adjacent a guide device, provided as a third component part, for guiding a tape pull-out element. The known recording and/or reproducing apparatus further includes a magnetic head forming a third component part and having a plurality of magnet systems, which magnetic head, by means of an actuator device, can be positioned with its magnet systems exactly on tracks to be scanned on a magnetic tape provided as a record carrier tape, the actuator device being carried with the aid of two bearing pins, which each form a second component part, and the actuator device having a stator, which forms a second component part. In the case of the known recording and/or reproducing apparatus, a cassette which accommodates a magnetic tape can be loaded into the recording and/or reproducing apparatus, after which the magnetic tape can be driven with a comparatively high tape speed with the aid of drive means. It has been found that during such driving of the magnetic tape in the known recording and/or reproducing apparatus, the pin-like second component parts, i.e. the bearing spindle and the bearing pins, and the third component parts, which are movable with respect to the second component parts, i.e. the tape guide roller and the magnetic head, can be set into vibration in directions of vibration oriented transversely to the pin-like second component parts, for example vibrations in a comparatively wide frequency range around 800 Hz.

It is an object of the invention to preclude the aforementioned problems or at least reduce them to proportions which are no longer annoying and to provide an improved recording and/or reproducing apparatus.

BRIEF SUMMARY OF THE INVENTION

Owing to the provision of the characteristic features in accordance with the invention, it is achieved by simple means and in a constructionally simple manner that between each pin-like second component part and a first component part, which is rigid in a direction transverse to the longitudinal direction of the pin-like second component part and which is arranged to be non-movable, a damping connection is formed with the aid of the damping element support and the damping element of an elastically deformable material, the damping element of this damping connection acting to absorb vibrations and counteracting the appearance of vibrations as described hereinbefore, the damping element converting vibration energy into heat through the internal friction in the damping element. This precludes vibrations as described above of a pin-like second component part and of the third component part, which is movable with respect to such a second component part and which serves to and is adapted to cooperate with a record carrier in the form of a tape, or at least reduces said vibrations to such an extent that no undesired effects can occur during the cooperation between the third component part and the record carrier in the form of a tape.

In a recording and/or reproducing apparatus in accordance with the invention it has proved to be advantageous when, in addition, the damping element support is formed by a resilient arm of a blade spring configuration, which has a fixing portion by which the blade spring configuration is connected to a first component part, and in the area of a free end of the damping element support formed by the resilient arm, a damping element made of a damping elastomer is mounted, which damping element acts upon a free end of a pin-like second component part, and subsequently, the pin-like second component part takes the form of a bearing spindle for a guide member of a tape guide roller, which guide member forms a third component part. Thus, effects which disturb a smooth and steady tape transport are precluded in a highly reliable manner.

However, in a recording and/or reproducing apparatus in accordance with the invention it has also proved to be advantageous when, in addition, a first component part is formed by a stator of an actuator device for positioning a magnetic head, which forms a third component part, and two pin-like second component parts provided, which take the form of bearing pins for holding the actuator device, and a bridge-like damping element support is connected to the two bearing pins provided as second component parts, and the bridge-like damping element support is connected to a damping element which consists of a damping elastomer and which urges against the first component part formed by the stator of the actuator device. In this way, it is achieved that problems which affect a correct scanning of a magnetic tape by a magnetic head which is movably supported by means of an actuator device and which are attributable to undesired vibrations of the magnetic head, are avoided in a highly reliable manner.

The above-mentioned as well as further aspects of the invention will become apparent from the embodiment described hereinafter by way of example and will be elucidated with reference to this example.

BRIEF DESCRIPTION OF THE DRAWINGS

The invention will now be described in more detail with reference to the drawings, which show an embodiment given by way of example but to which the invention is not limited.

DETAILED DESCRIPTION OF THE INVENTION

Figure 1:
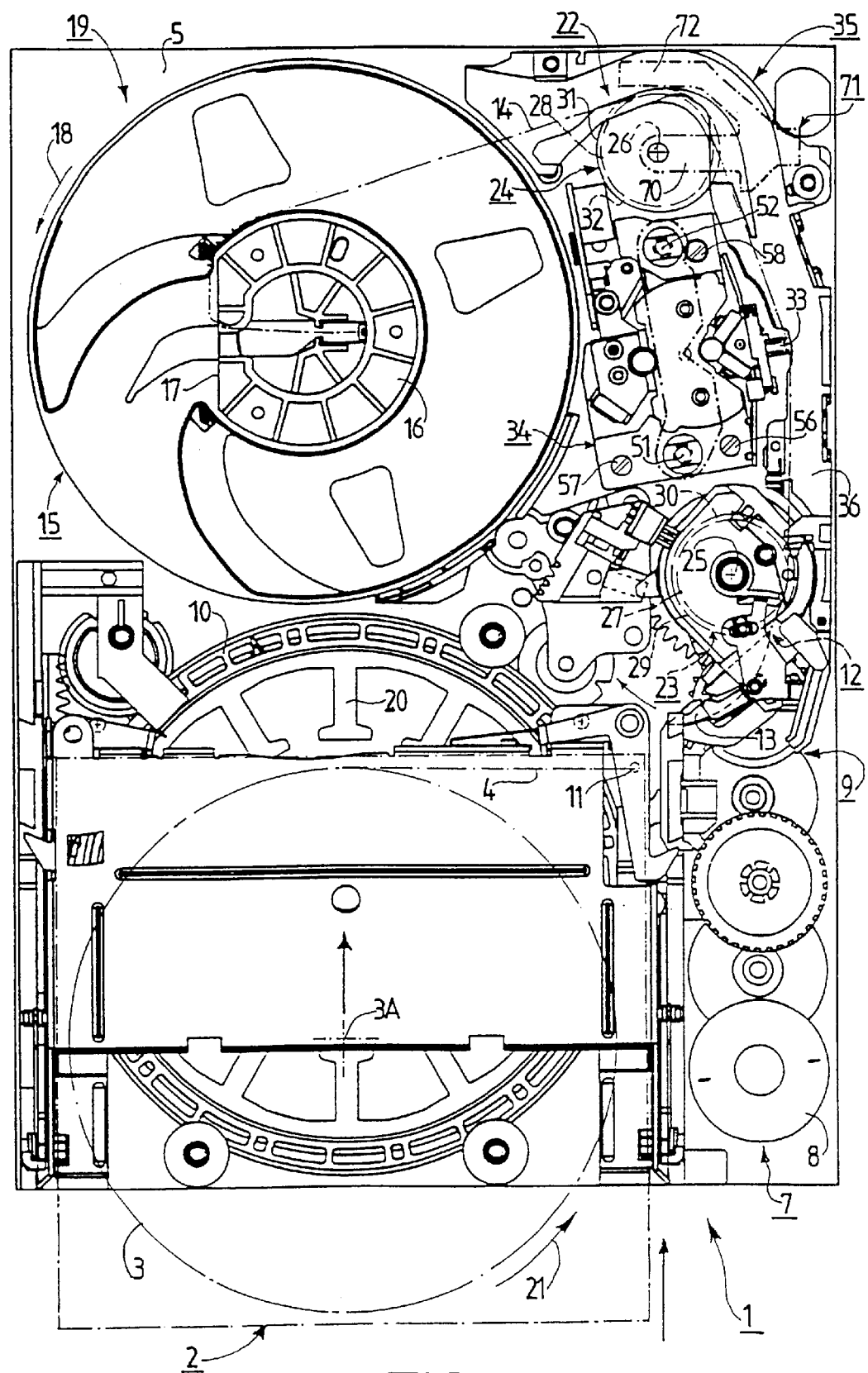
FIG. 1 is a plan view which shows a recording and/or reproducing apparatus in accordance with an embodiment of the invention, which apparatus has a tape guide roller which is rotatably supported by means of a bearing spindle and which has a magnetic head which is movably supported with the aid of an actuator device.

FIG. 1 shows a recording and reproducing apparatus 1 which serves to and is configured for the recording and reproduction of digital data and by means of which a large amount of data can be stored. The recording and reproducing apparatus 1 is briefly referred to hereinafter as the storage apparatus 1.

The storage apparatus 1 is a development of a recording and reproducing apparatus which includes features forming the subject matter of nine patent applications in total, namely the European priority patent applications bearing the application numbers 98 890 332.4, 98 890 333.2, 98 890 334.0, 98 890 335.7, 98 890 336.5, 98 890 337.3, 98 890 338.1, 98 890 339.9 and 98 890 340.7 filed on Nov. 12, 1998. Said recording and reproducing apparatus was already shown at the Comdex fair of Las Vegas in the USA from Nov. 15, 1998 and is consequently known. The disclosure represented by the exhibited recording and reproducing apparatus and for a substantial part contained in the nine aforementioned European priority patent applications is incorporated herein by reference. For this reason, the remainder of the description of the storage apparatus shown in FIG. 1 is limited to only those areas and parts which are relevant in the present context. Furthermore, in the present context reference is also made to the two European priority patent applications bearing the application numbers 99 890 360.3 and 99 890 361.1, both filed on Nov. 11, 1999.

The storage apparatus is adapted to hold a cassette 2, which is shown only in dash-dot lines in FIG. 1. The cassette 2 accommodates a supply reel 3, which is rotationally drivable with respect to a reel axis 3A and which serves to and is adapted to take up (wind) a magnetic tape 4, which tape as well as the supply reel 3 are shown merely as dash-dot lines in FIG. 1. The magnetic tape 4 can be scanned along a plurality of tracks which extend in the longitudinal direction of the magnetic tape 4, in order to record or reproduce digital data.

The storage apparatus 1 has a chassis 5 which carries the individual constructional units and parts of the storage apparatus 1. Hereinafter, only those of the constructional units and parts are mentioned which are relevant in the present context.

For holding a cassette 2 and moving it from a loading position into an operating position in the storage apparatus 1 the storage apparatus 1 has a movable cassette holder 6. The movable cassette holder 6 is movable along an L-shaped path of movement between a loading position, in which a cassette 2 can be inserted into the cassette holder 6, and an operating position, in which an inserted cassette 2 is in its operating position.

To move the cassette holder 6 and further movable apparatus parts of the storage apparatus 1 the storage apparatus 1 has drive means 7. The drive means 7 include a motor 8 and a gear mechanism 9, by means of which a ring-shaped drive gear wheel 10 is drivable. With the aid of the ring-shaped drive gear wheel 10 cam devices, by means of which the movable cassette holder 6 is movable, can be driven via gear racks.

When the cassette holder 6 is in its operating position a cassette 2 loaded into the cassette holder 6 is also in its operating position. As already stated, the cassette 2 accommodates a supply reel 3 on which the magnetic tape 4 is wound. At the free end of the magnetic tape 4 the magnetic tape 4 is connected to a coupling pin 11. In the operating position of the cassette 2 pull-out means 12 can be coupled to the coupling pin 11, which means include a pull-out element 13 and a pull-out tape 14. For the clarity of the drawing the pull-out tape 14 is shown as a dash-dot line in FIG. 1. The pull-out tape 14 is passed from pull-out element 13 to a take-up reel 15 and is fixedly connected to a hub portion 16 of the take-up reel 15. The hub portion 16 has a recess 17 which is adapted to receive the pull-out element 13. By means of a first motor, not shown, of the storage apparatus 1 the take-up reel 15 is rotationally drivable in a direction indicated by an arrow 18. The rotational drive of the take-up reel 15 enables the pull-out tape 14 and, consequently, the pull-out element 13 to be driven, as a result of which, after coupling of the pull-out element 13 to the coupling pin 11, the magnetic tape 4 can be pulled out of the cassette 2 with the aid of the pull-out tape 14 and can be moved up to the take-up reel 15 and can be wound onto the take-up reel 15, upon which recording on or reproducing from the magnetic tape 4 is possible. To guide the pullout element 13 during its movement to the take-up reel 15 guide means 35 have been provided, which essentially comprise two superposed guide rails 36, of which only the upper guide rail 36 is visible in FIGS. 1 and 2.

The storage apparatus 1 has drive means 19 for driving the magnetic tape 4. The drive means 19 include the first motor, not shown, which has been provided in the storage apparatus 1 in order to drive the take-up reel 15 and which drives the take-up reel 15 with the aid of a drive member, not shown, which also forms a part of the drive means 19. The drive means 19 further include a second motor, which is not shown completely. FIG. 1 only shows a stator section 20 of the second motor, which stator section carries excitation coils, not shown, by means of which a rotor, not shown, of this second motor can be driven. The second motor can drive crown-like gear teeth which mesh with mating gear teeth provided on the supply reel 3, the supply reel 3 thus being drivable in a direction indicated by an arrow 21 by means of the second motor to wind the magnetic tape 4 onto the supply reel 3. Thus, the supply reel 3 also forms a part of the drive means 19. The two kinds of gear teeth will be described in greater detail hereinafter.

The storage apparatus 1 further has guide means 22 for guiding the magnetic tape 3. In the present case the guide means 22 include two tape guide rollers 23 and 24. Each of the two tape guide rollers 23 and 24 has a bearing spindle, 25 and 26 respectively, which spindles are stationarily connected to the chassis 5, and a cylindrical guide member, 27 and 28 respectively, which is rotatable with respect to the respective bearing spindle 25 or 26. Further, each of the two tape guide rollers 23 and 24 has an end flange, 29, 30 and 31, 32 respectively, in the area of each of the two axial ends of the respective cylindrical guide members 27 and 28, which end flanges extend transversely to the respective bearing spindles 25 and 26.

The storage apparatus 1 further has a multi-track magnetic head 33 which serves for scanning the magnetic tape 4. The magnetic head 33 is mounted on an actuator device 34 by means of which the magnetic head 33 is movable in a direction perpendicular to the longitudinal direction of the magnetic tape 4 to keep the individual magnet systems of the multi-track magnetic head 33 constantly aligned with respect to the scanning tracks of the magnetic tape 4, so as to guarantee an exact tracking. The magnetic head 33 is arranged in the area between the two tape guide rollers 23 and 24. With the aid of the actuating device 34 the magnetic head 33 can follow variations in the height position of the magnetic tape 3.

Figure 8:
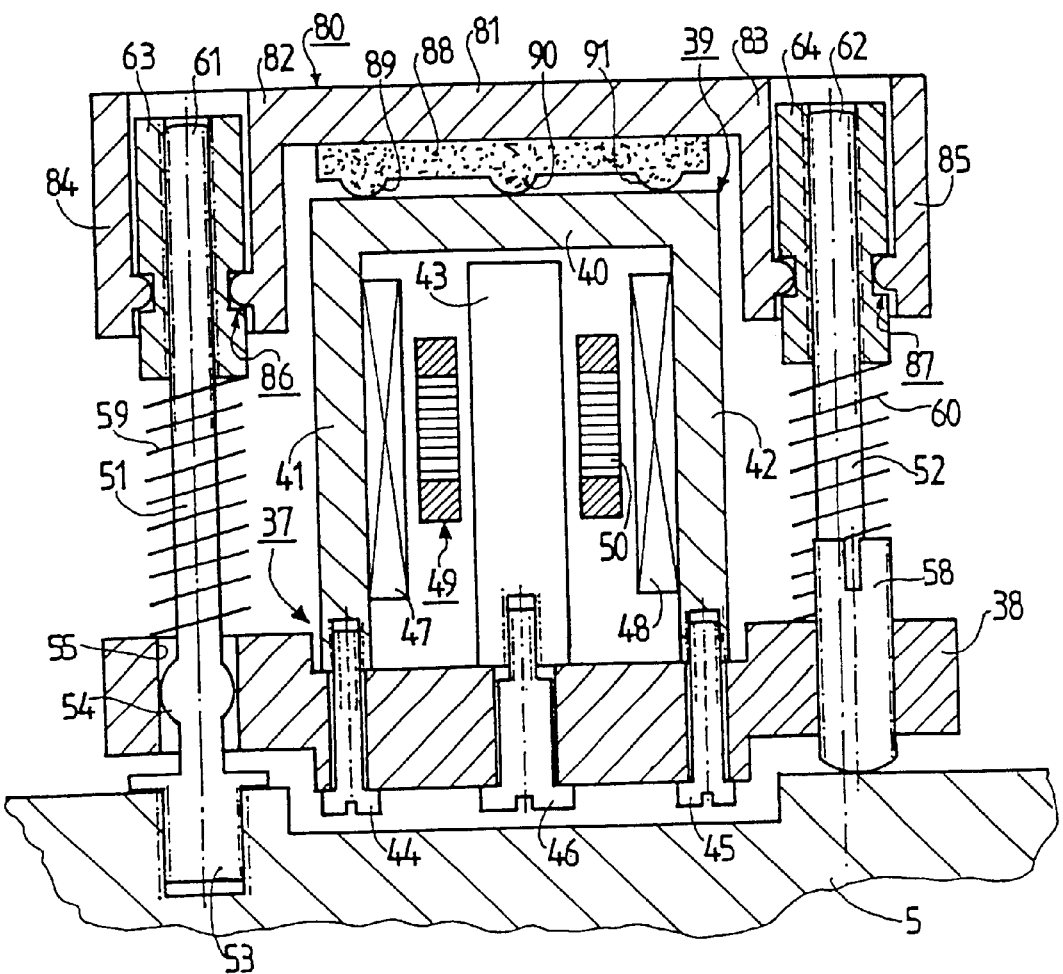
FIG. 8 is a diagrammatic sectional view of the actuator device of the recording and/or reproducing apparatus as shown in FIG. 1 and having a further damping element support and a damping element.

For the actuator device 34 reference is made to FIG. 8, which diagrammatically shows a part of the actuator device 34. The actuator device 34 forms a further operating means for cooperation with the magnetic tape 4. The actuator device 34 has a so-called first component part, which is formed by a stator 37 of the actuator device 34 and which is fixedly connected to the chassis 5 and which is arranged to be immovable with respect to its adjacent chassis portion in a direction substantially parallel to this chassis portion and which is inherently stiff at least in directions oriented parallel to said chassis portion. The stator 37 consists of a base plate 38 to which a cross-sectionally U-shaped outer return element 39 of a magnetizable material is connected, which element has an upper wall 40 and two side walls 41 and 42. A turret-shaped inner return element 43, which is also made of a magnetizable material, is also connected to the base plate 38. Said connections are made with the aid of three screws 44, 45 and 46. A magnet 47 or 48 is connected to a respective one of the two side walls 41 and 42. In the area between the two magnets 47 and 48 and the inner return element 43 an actuator 49 is arranged, which actuator is mounted so as to be movable parallel to the longitudinal direction of the inner return element 43 and which includes a coil 50 to which a signal can be applied, in response to which the actuator 49 can perform a linear actuating movement. The magnetic head 33 is mechanically connected to the actuator 49, as a result of which the magnetic head 33 can follow given longitudinal tracks on the magnetic tape 4 with the aid of the actuator 49 of the actuator device 34. The magnetic head 33, which is connected to the actuator 49, forms a part of the further operating means for cooperation with the magnetic tape 4 and forms a so-called third component part of these operating means, which third component part serves to and is adapted to cooperate with the magnetic tape 4.

The actuator device 34, which forms a further operating means, includes two so-called second component parts which are pin-like and which are fixedly connected to the chassis 5 and which project from a chassis portion and have a free end which is remote from this chassis portion. These two pin-like second component parts are formed by two bearing pins 51 and 52. The two bearing pins 51 and 52 are screwed into the chassis 5 by their end portions 53 which face the chassis. Each of the two bearing pins 51 and 52 has a substantially spherical thickened portion 54 disposed in a bore 55 in the base plate 38. In this way, it is achieved that the base plate 38 and, consequently, the parts of the actuator device 34 which are connected to the base plate 38 can perform a pivotal movement with respect to the chassis 5. Thus, it is achieved that the relative position of the base plate 38 with respect to the chassis 5 is variable, i.e. adjustable. For this adjustment the actuator device 34 has a total of three set-screws 56, 57 and 58, of which only the set-screw 58 is visible in FIG. 8. The adjustment of the base plate 38 by means of the set-screws 56, 57 and 58 is effected against the force exerted by two pressure springs 59 and 60 fitted onto the bearing pins 51 and 52 and which act upon two threaded sleeves 63 and 64 screwed onto the bearings pins 51 and 52 in the areas of the free ends 61 and 62 of the bearing pins 51 and 52.

Figure 2:
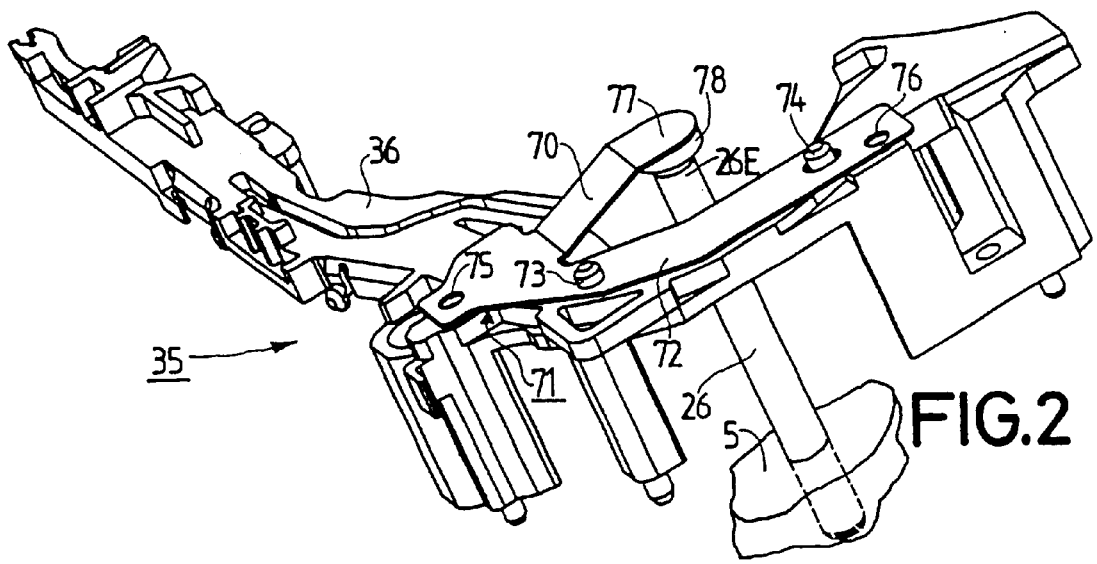
FIG. 2 is an oblique top view which shows a part of the recording and/or reproducing apparatus shown in FIG. 1, which part includes the bearing spindle for the tape guide roller and a damping element support as well as a damping element for damping vibrations of the bearing spindle.
Figure 3:
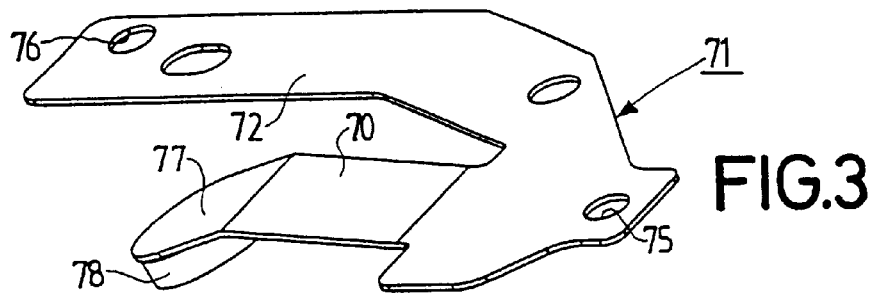
FIG. 3 is an oblique top view which shows the damping element support and the damping element for vibration damping, the damping element support being shown in its non-mounted initial condition.
Figure 4:
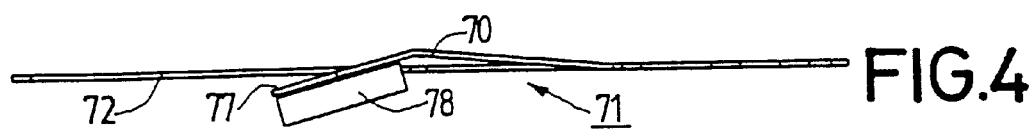
FIG. 4 is a side view which shows the damping element support and the damping element shown in FIG. 3, the damping element support also being shown in its initial condition.
Figure 5:
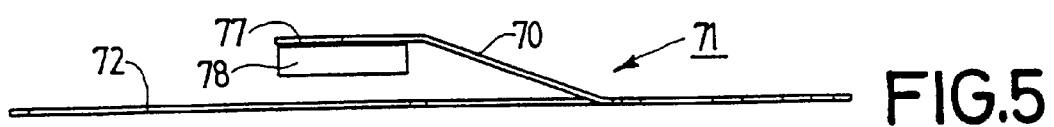
FIG. 5 shows, in a manner similar to FIG. 4, the damping element support and the damping element, the damping element support being shown in its mounted operating condition.

As is shown diagrammatically in dash-dot lines in FIG. 1 and as is apparent from FIG. 2 the guide rail 36 provided as a so-called first component part is fixedly connected to a damping element support 70. In the present case, the damping element support 70 is formed by a resilient arm 70 of a blade spring configuration 71, which shown not only in FIG. 2 but also in FIGS. 3, 4 and 5. The blade spring configuration 71 has a fixing portion 72, which is positioned with the aid of two positioning projections 73 and 74, which project from the guide rail 36, and which is secured to the guide rail 36 with the aid of two fixing screws, not shown in the Figures, which fixing screws are passed through two holes 75 and 76 in the blade spring configuration 71.

As is apparent from FIGS. 1 and 2, the damping element support 70, i.e. the resilient arm 70 of the blade spring configuration 71, extends over the bearing spindle 26 of the tape guide roller 24, which for the sake of simplicity is not shown in FIG. 2, said bearing spindle forming a so-called second component part. The damping element support 70, i.e. the resilient arm 70 of the blade spring configuration 71, has its free end 77 connected to a damping element 78 of an elastically deformable material, which damping element exerts a spring load on the free end 26E of the bearing spindle 26, which is effected exactly in the longitudinal direction of the bearing spindle 26. The damping element 78 now consists of a damping elastomer.

As regards the blade spring configuration 71 it is to be noted that in practice it has proved to be advantageous when the blade spring configuration 71 consists of a spring steel, a thickness of the spring steel in a range between 0.2 mm and 0.4 mm appearing to be appropriate. A thickness of the spring steel of approximately 0.3 mm has proved to be particularly advantageous. The spring load exerted on the free end of the bearing spindle 26 by means of the resilient arm 70 of the blade spring configuration 71 should lie within a given range and tests have revealed that a favorable upper limit for the spring force lies in a range between 0.3 kg and 0.35 kg. A damping elastomer has proved to be advantageous as a material for the damping element 78; such damping elastomers are commercially available. Such a damping elastomer can be attached simply to the free end 77 of the resilient arm 70 with the aid of an adhesive foil. The thickness of such a damping elastomer may range between 1 mm and 3 mm and tests have shown that a thickness of approximately 1.5 mm is favorable.

Figure 6:
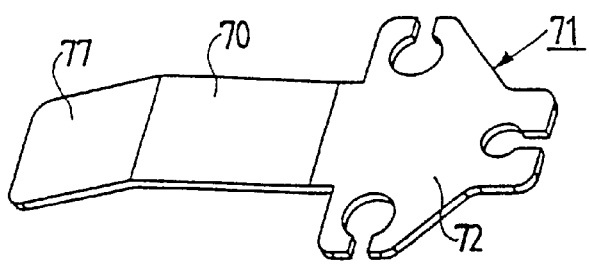
FIG. 6 shows, in a manner similar to FIG. 5, a second variant of a damping element support.
Figure 7:
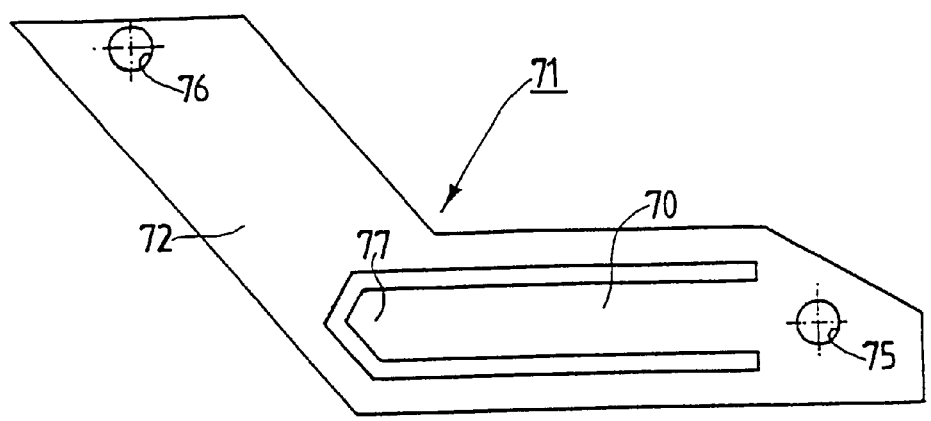
FIG. 7 is a plan view which shows a third variant of a damping element support.

FIGS. 6 and 7 show two further blade spring configurations 71, which are configurations examined during tests carried out by the applicant and which have likewise proved to be favorable configurations. These two blade spring configurations do not require any further explanation.

As is shown diagrammatically in dash-dot lines in FIG. 1 and as is apparent from FIG. 8, the operating means formed by the actuator device 34 includes damping means. In the present case, a bridge-like damping element support 80 is connected to the two pin-like so-called second component parts, i.e. to the two bearing pins 51 and 52. The bridge-like damping element 80 has a central portion 81 which in the area of each of its two ends 82 and 83 is connected to a respective mounting sleeve 84 or 85. The two mounting sleeves 84 and 85 are mounted on the threaded sleeves 63 and 64 and are secured to the respective threaded sleeves 63 and 64 by latching means 86 and 87, respectively. The bridge-like damping element support 81 extends over the first component part 37, namely over the upper wall 40 of the outer return element 39.

In the area of the central portion 81 a damping element 88 made of an elastically deformable material is connected to the damping element support 80. The damping element 88 also consists of a damping elastomer. In the present case, the damping element 88 has a flat bounding surface 89 which faces the central portion 81, an adhesive joint, not shown in FIG. 8, being provided between the flat bounding surface 89 of the damping element 88 and the central portion 81 of the damping element support 80. In the area remote from the central portion 81 the damping element 88 has three projections 89, 90 and 91, with which the damping element 88 engages against the upper wall 40 of the outer return element 39, as a result of which the damping element 88 is urged against the upper wall 40 under spring load.

Owing to the provision of the blade spring configuration 71 with its resilient arm 70, which acts as a damping element support 70, and of the damping element 78 at the tape guide roller 24 and owing to the provision of the bridge-like damping element support 80 and the damping element 88 at the actuator device 34 it is achieved in a simple and effective manner that the generation of undesired vibrations in the area of the tape guide roller 24 and in the area of the actuator device 34, as a result of which neither the guide member 28 of the tape guide roller 24 nor the actuator 49 and, consequently, the magnetic head 33 carried by the actuator 49 is subjected to undesired vibration effects.

The invention is not limited to the embodiment of a recording and reproducing apparatus as described hereinbefore. For example, in such a recording and reproducing apparatus a damping element support may be fixedly connected to the bearing spindle of a tape guide roller, in which case the damping element support extends over a stationary and essentially rigid guide rail or extends over another rigid counterpart, which is connected stationarily to the chassis, and is connected to a damping element which acts upon the guide rail or upon the counterpart under spring load. An alternative solution for an actuator device as described above may be to fixedly connect the damping element support to the stator of the actuator device, the free ends of this support extending over the two bearing pins and acting upon the free ends of the bearing pins by means of two damping elements connected to the damping element support.

What is claimed is:

1. A recording and/or reproducing apparatus (1) comprising:
   a chassis (5);
   at least one first component part (36, 37), which is fixedly connected to the chassis (5) and which is arranged to be immovable with respect to its adjacent chassis portion in a direction substantially parallel to this chassis portion and which is inherently stiff at least in directions oriented parallel to said chassis portion;
   operating means (24, 33) for cooperation with the record carrier (4), the operating means (24, 33) including at least one second component part (26, 51, 52), which has a pin-like construction and which is fixedly connected to the chassis (5) and which projects from a chassis portion and which has a free end (61, 62) which is remote from this chassis portion, and at least one third component part (28, 33), which is movable with respect to the at least one second component part (26, 51, 52) and which serves to and is adapted to cooperate with the record carrier (4),
   wherein one component part of the at least one first component part (36, 37) and the at least one second component part (26, 51, 52) is fixedly connected to a damping element support (70, 80), which damping element support (70, 80) extends over the other one of said component parts, and
   further wherein the damping element support (70, 80) is connected to a damping element (78, 88) which consists of an elastically deformable material and which acts upon the other one of said component parts under spring load,
   still further wherein the damping element support (70) is formed by a resilient arm (70) of a blade spring configuration (71), which has a fixing portion (72) by which the blade spring configuration (71) is connected to a first component part (36), and
   still further wherein, in the area of a free end (77) of the damping element support (70) formed by the resilient arm (70), a damping element (78) made of a damping elastomer is mounted, which damping element acts upon a free end (26E) of a pin-like second component part (26).

2. A recording and/or reproducing apparatus (1) as claimed in claim 1, wherein the pin-like second component part takes the form of a bearing spindle (26) for a guide member (28) of a tape guide roller (24), which guide member forms a third component part.

3. A recording and/or reproducing apparatus (1) comprising:
   a chassis (5);
   at least one first component part (36, 37), which is fixedly connected to the chassis (5) and which is arranged to be immovable with respect to its adjacent chassis portion in a direction substantially parallel to this chassis portion and which is inherently stiff at least in directions oriented parallel to said chassis portion;
   operating means (24, 33) for cooperation with the record carrier (4), the operating means (24, 33) including at least one second component part (26, 51, 52), which has a pin-like construction and which is fixedly connected to the chassis (5) and which projects from a chassis portion and which has a free end (61, 62) which is remote from this chassis portion, and at least one third component part (28, 33), which is movable with respect to the at least one second component part (26, 51, 52) and which serves to and is adapted to cooperate with the record carrier (4),
   wherein one component part of the at least one first component part (36, 37) and the at least one second component part (26, 51, 52) is fixedly connected to a damping element support (70, 80), which damping element support (70, 80) extends over the other one of said component parts, and
   further wherein the damping element support (70, 80) is connected to a damping element (78, 88) which consists of an elastically deformable material and which acts upon the other one of said component parts under spring load,
   further wherein a first component part is formed by a stator (37) of an actuator device (34) for positioning a magnetic head (33), which forms a third component part, and
   two pin-like second component parts are provided, which take the form of bearing pins (51, 52) for holding the actuator device (34), and a bridge-like damping element support (80) is connected to the two bearing pins (51, 52) provided as second component parts, and the bridge-like damping element support (80) is connected to a damping element (88) which consists of a damping elastomer and which urges against the first component part formed by the stator (37) of the actuator device (34).

* * * * *